United States Patent [19]
Iwabuchi et al.

[11] Patent Number: 6,040,026
[45] Date of Patent: Mar. 21, 2000

[54] PRESSURE-SENSITIVE ADHESIVE SHEET AND LAMINATE OF PRESSURE-SENSITIVE ADHESIVE SHEETS

[75] Inventors: Hiroaki Iwabuchi, Urawa; Yoichi Sone, Kumagaya; Tetsuyuki Utagawa, Kawaguchi, all of Japan

[73] Assignee: LINTEC Corporation, Tokyo, Japan

[21] Appl. No.: 08/976,037

[22] Filed: Nov. 21, 1997

[30] Foreign Application Priority Data

Nov. 29, 1996 [JP] Japan ..................................... 8-319247

[51] Int. Cl.[7] ...................................................... C09J 7/02
[52] U.S. Cl. .................... 428/40.1; 229/87.01; 428/41.4; 428/41.7; 428/41.8; 428/202; 428/352; 462/72
[58] Field of Search ..................... 428/202, 40.1, 428/41.8, 41.7, 41.4, 352, 447; 229/87.01; 462/72

[56] References Cited

U.S. PATENT DOCUMENTS

| | | | |
|---|---|---|---|
| 5,356,719 | 10/1994 | Hamada | 428/447 |
| 5,562,992 | 10/1996 | Kidon et al. | 428/447 |
| 5,654,093 | 8/1997 | Kidon | 428/352 |
| 5,817,382 | 10/1998 | Cheng | 428/202 |

FOREIGN PATENT DOCUMENTS 0 579 430  1/1994  European Pat. Off. .

*Primary Examiner*—Nasser Ahmad
*Attorney, Agent, or Firm*—Oblon, Spivak, McClelland, Maier & Neustadt, P.C.

[57] ABSTRACT

There are disclosed a pressure-sensitive adhesive sheet which comprises a substrate sheet, a pressure-sensitive adhesive layer formed on one side of the substrate sheet and a release layer comprising a cured product from an ionizing radiation-curing type releasable resin formed on the other side of the substrate sheet; and a laminate which comprises a plurality of these pressure-sensitive adhesive sheets that are superimposed on one another so that the pressure-sensitive adhesive layer and the release layer directly face each other and the whole surfaces of the pressure-sensitive adhesive layers are covered with the release layers. The above pressure-sensitive adhesive sheets and the laminate formed therefrom can be produced with good workability with a simplified apparatus without the generation of curls, and thus are well suited for use as display labels etc.

13 Claims, 2 Drawing Sheets

PRESSURE-SENSITIVE ADHESIVE SHEET AND LAMINATE OF PRESSURE-SENSITIVE ADHESIVE SHEETS

BACKGROUND OF THE INVENTION

1. Field of the Invention

The present invention relates to a pressure-sensitive adhesive sheet and a laminate of pressure-sensitive adhesive sheets. More particularly, it pertains to a pressure-sensitive adhesive sheet and a laminate composed of a plurality of said sheets superimposed on one another. Both the sheet and laminate are prevented from curling and are well suited for a home-delivery label, a commodity display label, a warning label and like label that are adhesively bonded to home-delivery cargoes, commodity packages, etc.

2. Description of the Related Arts

A label has heretofore been adhesively bonded to the surface of a home delivery cargo, a commodity package, etc. in order to display the kind, handling, etc. of the commodity. The display label such as a home-delivery label, a product display label and a warning label has heretofore been used in such a manner that a display label superimposed on a mount sheet, which is composed of release paper and is in the form of sheet or tape, is peeled off from the mount sheet in the form of sheet, or peeled off therefrom after cutting a mount sheet in the form of tape at prescribed positions.

However, such a label suffers from the disadvantage that the release paper remains as refuse, which increases waste materials in response to the amount of the release paper to be used and thereby brings about environmentally unfavorable results and besides that a worker is in danger of being injured at the time of cutting a mount sheet in the form of tape.

In order to overcome the above-mentioned disadvantage, Japanese Utility Model Registration No. 3,003,840 proposes a laminate composed of a plurality of pressure-sensitive adhesive sheets superimposed on one another, each of which comprises a substrate sheet, a pressure-sensitive adhesive layer formed by applying a pressure-sensitive adhesive onto one side of the substrate sheet, leaving the uncoated portion on the edges (periphery) thereof and a release layer formed on the other side of the substrate sheet, said pressure-sensitive adhesive layer and said release layer directly facing each other. The aforesaid pressure-sensitive adhesive sheet is advantageous in that the sheets can be peeled off one by one and adhesively bonded to an object in quite a simple manner with good workability and safety without causing waste materials such as release paper.

However, since the cured product from a conventional heat curing type silicone resin is used in the release layer of the pressure-sensitive adhesive sheet which constitutes the foregoing laminate and the silicone resin is cured at a high temperature of about 100 to 200° C. in the production step of the pressure-sensitive adhesive sheet, the objective pressure-sensitive adhesive sheet is inevitably curled by the deformation of the substrate sheet due to heat as well as the expansion and contraction of the substrate sheet due to the release and absorption of moisture. In addition, a large-scale installation is required along with long working hours. Furthermore, most of the heat curing type silicone resins involve the problem of exerting adverse influence upon safety, sanitation and environment because of a large amount of a solvent used in the production step. FIG. 1 is an example showing a perspective view of a conventional pressure-sensitive adhesive sheet laminate in which an edge is curled.

On the other hand, UV and EB curing systems which have recently been developed employ ultraviolet rays (UV), and electron beam (EB), respectively and are characterized in that they enable the silicone resin to be cured under a solventless condition at a low temperature, thus contributing to low pollution, resources saving and labor saving and besides making it possible to produce high-performance coatings. Accordingly the above-mentioned systems have found wide use in a variety of fields such as coating materials, inks, adhesives, coating agents, resists, photosensitive printing boards and dental materials.

SUMMARY OF THE INVENTION

An object of the invention is to provide, under such circumstances, a pressure-sensitive adhesive sheet and a laminate of a plurality of said sheets superimposed on one another. Those sheet and laminate can be produced by using a simple apparatus with good workability and are well suited for a display label and the like.

As a result of intensive research and development accumulated by the present inventors in order to achieve the above-mentioned object, it has been found that the foregoing object can be attained by the use of a layer comprising a cured product from a releasable resin which can be cured at a low temperature by the ionizing radiation of UV, EB or the like, as a release layer for a pressure-sensitive adhesive sheet. The present invention has been accomplished by the above-mentioned findings and information.

Specifically, the present invention provides a pressure-sensitive adhesive sheet which comprises a substrate sheet, a pressure-sensitive adhesive layer formed on at least a part of one side of said substrate sheet and a release layer comprisisng a cured product from an ionizing radiation-curing type releasable resin formed on at least a part of the other side of said substrate sheet.; and a laminate which comprises a plurality of pressure-sensitive adhesive sheets that are superimposed on one another so that a pressure-sensitive adhesive layer and a release layer directly face each other and the whole surfaces of the pressure-sensitive adhesive layers are covered with the release layers.

Figure 1:
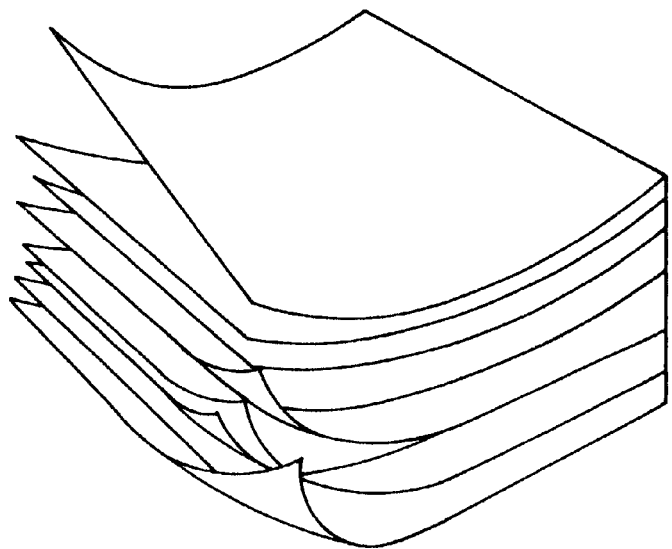
FIG. 1 is a perspective view showing an example of a conventional laminate of pressure-sensitive adhesive sheets.

1: substrate sheet
2: pressure-sensitive adhesive layer
3: release layer
4: sealing layer
5: sealing layer
6: printing layer
7: release sheet
10: pressure-sensitive adhesive sheet
11: pressure-sensitive adhesive sheet
12: pressure-sensitive adhesive sheet
20: release sheet A: end
B: end

DESCRIPTION OF PREFERRED EMBODIMENTS

Firstly, some descriptions will be given of the pressure-sensitive adhesive sheets and the laminate of said sheets according to the present invention with reference to the attached drawings.

Figure 2:
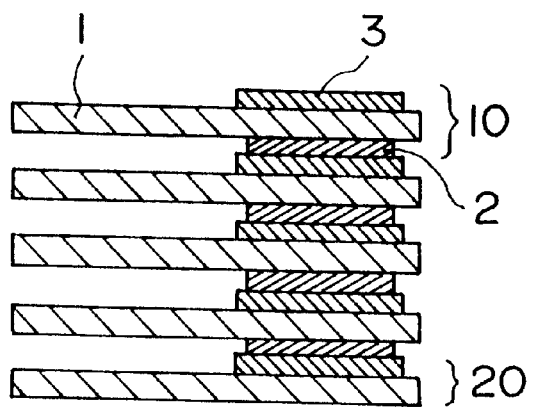
FIG. 2 is a cross-sectional view showing an example of a laminate of pressure-sensitive adhesive sheets of the present invention.
Figure 3:
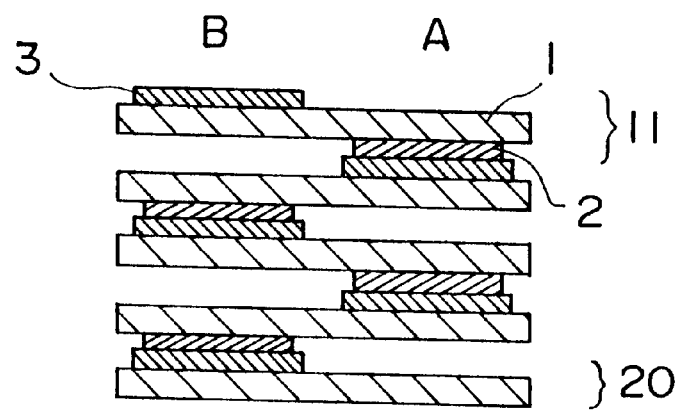
FIG. 3 is a cross-sectional view showing another example of a laminate of pressure-sensitive adhesive sheets of the present invention.

FIG. 2 and FIG. 3 are each a cross-sectional view showing an example of a laminate of pressure-sensitive adhesive sheets of the present invention, said laminate being different from each other.

FIG. 2 is a cross-sectional view of a laminate, in which a plurality of pressure-sensitive adhesive sheets to be laminated have each a pressure-sensitive adhesive layer on the same place with respect to each of the substrate sheets. FIG. 2 points out a structure in which a pressure-sensitive adhesive sheet 10 of the invention having a substrate sheet 1 equipped on one side thereof with a pressure-sensitive adhesive layer 2 and on the other side thereof with a release layer 3 occupying a region at least corresponding to the pressure-sensitive adhesive layer 2, that is, just the rear of the place at which the pressure-sensitive adhesive layer 2 is formed, is superimposed one after another in a plurality of numbers so that the pressure-sensitive adhesive layer 2 and the release layer 3 directly face each other and the surface of the pressure-sensitive adhesive layer 2 in contact with the release layer 3 is wholly covered therewith.

On the other hand, FIG. 3 is a cross-sectional view of a laminate, in which a plurality of pressure-sensitive adhesive sheets to be laminated have each a pressure-sensitive adhesive layer on a place different from one another with respect to each of the substrate sheets. FIG. 3 also points out a structure in which a pressure-sensitive adhesive sheet 11 of the present invention having a substrate sheet 1 equipped at the end A of one side thereof with a pressure-sensitive adhesive layer 2 and at the other end B of the other side thereof with a release layer 3, is superimposed one after another in a plurality of numbers so that the pressure-sensitive adhesive layer 2 and the release layer 3 directly face each other and the surface of the pressure-sensitive adhesive layer 2 in contact with the release layer 3 is wholly covered therewith.

In FIG. 2 and FIG. 3, 20 denotes a release sheet.

Figure 4:
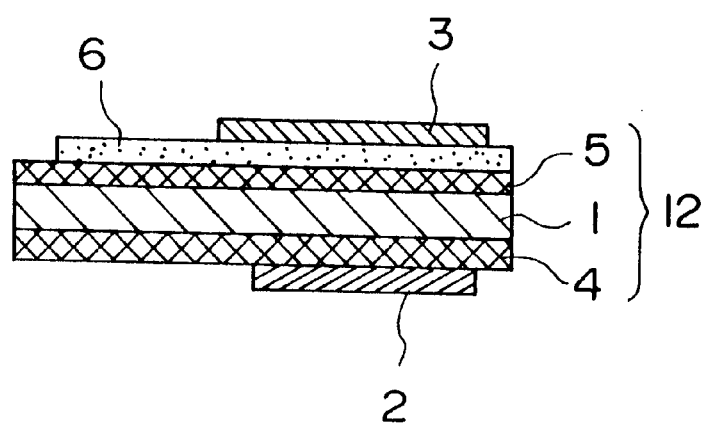
FIG. 4 is a cross-sectional view showing an example of a pressure-sensitive adhesive sheet of the present invention, in which the symbols are described as follows.

FIG. 4 is a cross-sectional view showing an example of a pressure-sensitive sheet according to the invention which is different from the foregoing sheets 10, 11, and points out a structure in which a substrate sheet 1 is equipped on one side thereof with a sealing layer 4 and a pressure-sensitive adhesive layer 2 in turn, and on the other side thereof with a sealing layer 5, an printing layer 6 and a release layer 3 in turn. In a pressure-sensitive adhesive sheet 12 having such a sealing layer, the pressure-sensitive adhesive layer 2 and the release layer 3 may each be placed on one side and the other side of the substrate sheet 1, respectively on the same ends relative to the sheet 1 as is the case with FIG. 2, or on the ends different from each other relative to the sheet 1 as is the case with FIG. 3.

The substrate sheet to be used for the pressure-sensitive adhesive sheet of the present invention is not specifically limited, but may be optionally selected for use from the sheets that have heretofore been customarily used for display labels. Examples of the substrate sheet include (the term "include" means to include but be not limited to) paper such as wood free paper, glassine paper and coated paper, and a plastics sheet such as a polyester sheet, a polyolefin sheet and a polystyrene sheet. The thickness of the substrate sheet is not specifically limited but may be suitably selected according to various situations, and it is usually in the range of 10 to 300 $\mu$m, preferably 50 to 150 $\mu$m.

In the case where a plastics sheet is used as the substrate sheet, the plastics sheet can be subjected as desired, to a roughening treatment such as a sandblasting treatment or a solvent treatment, an oxidation treatment such as a treatment with corona discharge, ozone-ultraviolet irradiation, flame, chromic acid or hot air, on either side or both sides thereof for the purpose of enhancing the adhesiveness between the plastics sheet and the layer to be placed thereon.

In the present invention, the pressure-sensitive adhesive layer is placed on one side of the substrate sheet and the release layer is placed on the other side thereof. In the case where the substrate sheet is composed of paper or nonwoven fabric, a sealing layer may be installed as desired between the substrate sheet and the pressure-sensitive adhesive layer. In addition, either or both of a sealing layer and a printing layer may be installed as desired in turn between them.

The above-mentioned sealing layer is provided for the purpose of enhancing the concealing property of the substrate sheet, adhesivity between the substrate sheet and the pressure-sensitive adhesive layer, release layer or printing layer, or printability in addition to the purpose of preventing a release agent, pressure-sensitive adhesive and/or printing ink from penetrating into the substrate sheet. In the case of the substrate sheet being made of paper and excessively soft, the sealing layer is provided for the purpose of imparting rigidity to said sheet. The sealing layer is exemplified by a layer composed usually of a styrene-butadiene copolymer, acrylic base resin, polyester base resin, polyurethane base resin or the like as a principal component and according to the demand, a filler such as clay, silica, calcium carbonate, titanium oxide and zinc oxide, said filler being incorporated in the principal component. The sealing layer has usually a thickness in the range of 0.1 to 30 $\mu$m.

It is possible in the present invention to form the printing layer to be provided when desired by means of a usual printing method, for example, gravure printing, screen printing, offset printing and flexographic printing by the use of a binder such as an acrylic base resin, polyurethane base resin, butyral base resin, nitrocellulose base resin, acetylcellulose base resin, polyester base resin, polyvinyl chloride base resin, and vinyl chloride/vinyl acetate base copolymer resin; and an ink comprising a colorant such a pigment and dye, an extender pigment, a solvent and the like.

The release layer may be placed directly upon the printing layer, but may be placed as desired, on a protective layer to be installed for protecting the printing layer. The protective layer is exemplified by a layer composed of polyethylene base resin, polyvinyl alcohol, acrylic base resin, starch, alkyd resin or the like. The protective layer has usually a thickness in the range of 0.1 to 30 $\mu$m.

The release layer to be used in the present invention is a layer comprising a cured product from an ionizing radiation-curing type releasable resin. The ionizing radiation-curing type releasable resin needs only to cure at a low temperature by ionizing radiation and exhibit releasability against the pressure-sensitive adhesive layer without specific limitation.

The ionizing radiation is exemplified by ultraviolet ray and electron beam, of which the ultraviolet ray is preferable. Ultraviolet ray is obtained by a high tension mercury vapor lamp, a fusion H lamp, an xenon lamp or the like, and electron beam is obtained by an electron beam accelerator. The ionizing radiation curing type releasable resin is exemplified by a resin which is curable with, for example, ultraviolet ray and is of radical addition type, radical polymerization type, platinum addition type, cationically curing type or the like. The curing characteristics of the ultraviolet curing type and those of the conventional heat curing type are collectively given in Table 1.

TABLE 1

|  | Ultraviolet curing | | | | Heat curing |
| --- | --- | --- | --- | --- | --- |
|  | radical addition type | radical polymerization type | platinum addition type | cationically curing type | addition condensation type |
| Curing temperature (° C.) | 0~80 | 0~80 | 0~80 | 0~80 | 100~200 |
| Curing time (sec) | 1≧ | 1≧ | 3~5 | 1≧ | 10~30 |
| Curability | good | good | poor | good | good |
| Curing installation | small | small | small | small | large |
| Processing workability | easy | easy | easy | easy | difficult |

As can be seen from Table 1, any of the ultraviolet curing type resin is lowered in curing temperature, shortened in curing time, downsized in a curing installation and facilitated in processing workability as compared with the conventional heat curing type resin. Such a lowered curing temperature is effective in preventing the resultant presure-sensitive adhesive layer from being curled by the deformation thereof or the absorption/release of moisture.

There is usablility for, in the present invention, any of the aforesaid ultraviolet curing resin of radical addition type, radical polymerization type, platinum addition type and cationically curing type as the ionizing radiation-curing type releasable resin. The platinum addition type resin among them involves the problem of a longer time required for curing, thus being inferior in curability, but can solve the problem by increasing the amount of ultraviolet irradiation.

On the other hand, the cationically curing type resin is liable to cure inhibition by a basic substance, though not shown in Table 1. Accordingly in the case of using a cationically curing resin in the release layer and when a basic substance is contained in a layer in contact with the release layer, a barrier layer is preferably placed between said layer and the release layer. For example, in the case where a basic substance which inhibits cure is contained in the substrate sheet or an ink to be used for printing, a barrier layer is preferably placed between the substrate layer or the printing layer and the release layer so that the basic substance may not exert adverse influence on the release layer. Needless to say, the barrier layer may double as the above-mentioned protective layer for protecting the printing layer.

The barrier layer needs only to be free from a basic substance and imparted with a film-forming property. The material for the barrier layer may be suitably selected from a so-called transparent varnish and the resin to be used for the aforesaid protection, provided that the material meets the aforesaid requirements. In the case where the pressure-sensitive adhesive layer is composed of an ordinary crosslinking type pressure-sensitive adhesive layer (crosslinked with an organic base crosslinking agent), the layer is difficult to peel. However, the problem is solved by the use of a pressure-sensitive adhesive layer which is not crosslinked or crosslinked by a metallic base crosslinking agent.

As mentioned hereinbefore, it is practically advantageous without requiring a large-scale installation in the present invention to use the ultraviolet ray-sensitive platinum addition type silicone resin or the ultraviolet ray-sensitive cationically curing type silicone resin in particular, as the foregoing four types of ionizing radiation-curing type releasable resin, while a ultraviolet ray-sensitive silicone resin is usually used for the requirement of releasability.

Examples of the ultraviolet ray-sensitive radical addition type silicone resin include a siloxane containing an alkenyl group, a siloxane containing a mercapto group, and a mixture of photocatalysts. The photocatalyst is not specifically limited, but is exemplified by acetophenone, propiophenone, benzophenone, xanthone, benzaldehyde, anthraquinone and fluorenone.

The ultraviolet ray-sensitive radical polymerization type silicone resin is exemplified by a silicone base oligomer and/or monomer in which an acryloyl group is introduced, and a mixture of (1) the silicone base oligomer and/or monomer, and at least one compound of (2) an acrylic base oligomer and/or a monomer and (3) a photopolymerization initiator. The photopolymerization initiator is not specifically limited, but may be suitably selected for use from the well-known compound which generates a radical on ultraviolet ray irradiation and which is exemplified by an organic peroxide, a carbonyl compound, an organosulfur compound and an azo compound.

On the other hand, examples of the ultraviolet ray-sensitive platinum addition type silicone resin include a mixture of methylvinylpolysiloxane, methylhydrogenpolysiloxane in each of which a polyfunctional vinyl group is introduced and a platinum-based catalyst. The platinum base catalyst to be used therein is not specifically limited provided that the catalyst exhibits photoactivity, and it is exemplified by a photoactive catalyst such as platinum bis(2,4-pentadionate), diphenylplatinum (1,5-cyclooctadiene) and diphenylplatinum (2,4-hexadiene) and a combination of aforesaid catalyst and a photo-degradation controlling agent typified by ehtylazocarboxylate.

Examples of the ultraviolet ray-sensitive cationically curing type silicone resin include a mixture of a silicone base oligomer and/or monomer in which a vinyl ether group or an epoxy group is introduced and a cationical photopolymerization catalyst. The cationical photopolymerization catalyst is not specifically limited, but is exemplified by the well-known compound as a cationical photopolymerization catalyst such as a triarylsulfonium salt, triaryliodinium salt and bis(dodecylphenyl)hexafluoroantimonate.

The release layer in the present invention can be formed by placing, for example, a layer composed of the above-mentioned ultraviolet ray-sensitive silicone resin on any of the substrate sheet, sealing layer, printing layer, protective layer and barrier layer and irradiating said layer at about 0 to 80° C. for curing with ultraviolet ray having a wavelength in the range of preferably 200 to 400 nm, more preferably 200 to 300 nm for cationically curing type silicone resin, and 300 to 400 nm for platinum addition type silicone resin. The release layer may contain, when necessary, an antioxidant, a heat stabilizing agent or the like. The thickness of the release layer can not be unequivocally determined, but it may be determined according to the situation usually in the range of 0.1 to 10.0 $\mu$m, preferably 0.5 to 4.0 $\mu$m.

The release layer need not be installed on the whole surfaces of the substrate sheet, but needs only to be placed, as already explained in the description of FIG. 2 and FIG. 3, on at least part of the surface of the substrate sheet opposite to the pressure-sensitive adhesive layer, usually on the region corresponding to the pressure-sensitive adhesive layer of an other pressure-sensitive adhesive sheet to be laminated to the present pressure-sensitive adhesive sheet. By partially installing the release layer in the above-mentioned manner, stamping and writing are made possible on the portion free from the release layer. Any of the sealing layer, printing layer, protective layer and barrier layer to be installed as desired between the substrate sheet and the release layer, is advantageously installed in a region corresponding to the aforesaid release layer or a scope larger than said region.

The pressure-sensitive adhesive layer to be formed on the substrate sheet opposite to the release layer or on the sealing layer to be installed as desired, is a layer comprising a pressure-sensitive adhesive. Said pressure-sensitive adhesive is not specifically limited, but is exemplified by well-known compounds such as a pressure-sensitive adhesive of acrylic base, rubber base and silicone base. Of these are preferable the non-crosslinked pressure-sensitive adhesive and the pressure-sensitive adhesives crosslinked with any of the metallic base crosslinking agent and the organic base crosslinking agent from the aspect of releasability between the pressure-sensitive adhesive layer and the release layer as well as the adhesivity between the pressure-sensitive adhesive layer and an adherend. It is preferable that the pressure-sensitive adhesive be selected properly in accordance with the type of the corresponding release layer.

For example, in the case of using the ultraviolet ray-sensitive radical polymerization type or platinum addition type silicone resin as the release layer, there is usability for any of the non-crosslinked pressure-sensitive adhesive and the pressure-sensitive adhesives crosslinked with any of the metallic base crosslinking agent and the organic base crosslinking agent.

In the case of using the ultraviolet ray-sensitive cationically curing silicone resin as the release layer, the application of a pressure-sensitive adhesive crosslinked with an organic base crosslinking agent to the pressure-sensitive adhesive layer brings about a fear of difficulty in releasing as mentioned hereinbefore, and therefore it is preferable to use the pressure-sensitive adhesive which is non-crosslinked or crosslinked with a metallic base crosslinking agent. Examples of the metallic base crosslinking agents include those that are well-known such as a chelate compound of any of titanium, aluminum and zirconium. Examples of the organic base crosslinking agents include but are not limited to those that are well-known such as a polyisocyanate compound, an epoxy compound and a melamine compound.

As the foregoing acrylic base pressure-sensitive adhesive, use is made of the compound containing as a principal component at least one member selected from the group consisting of a homopolymer of an acrylic acid ester, a copolymer containing at least two acrylic acid ester units and a copolymer of an acrylic acid ester and an other functional monomer.

Examples of the above-described acrylic acid esters include (meth)acrylic acid methyl ester, (meth)acrylic acid ethyl ester, (meth)acrylic acid butyl ester, (meth)acrylic acid pentyl ester, (meth)acrylic acid hexyl ester, (meth)acrylic acid heptyl ester, (meth)acrylic acid octyl ester, (meth)acrylic acid ethylhexyl ester, (meth)acrylic acid nonyl ester and (meth)acrylic acid decyl ester. Examples of the functional monomers include carboxyl group-containing monomers such as (meth)acrylic acid, itaconic acid and maleic anhydride, hydroxyl group-containing monomers such as (meth)acrylic acid hydroxyethyl ester and (meth)acrylic acid hydroxypropyl ester and amide group-containing monomer such as (meth)acrylamide and dimethyl(meth)acrylamide.

The acrylic base pressure-sensitive adhesive is roughly classified into solvent type and emulsion type, and the solvent type is usually composed of the above-mentioned acrylic base polymer, a solvent and, as desired, a crosslinking agent, a tackifying agent, etc. In this case, use can be made of the above-mentioned metallic base crosslinking agent and organic base crosslinking agent as the crosslinking agent.

On the other hand, the emulsion type acrylic base pressure-sensitive adhesive is usually composed of the above-mentioned acrylic base polymer, an emulsifying agent, an aqueous solvent and, as desired, a tackifying agent, etc.

As the aforesaid rubber base pressure-sensitive adhesive, use is made of the compound containing as a principal component, at least one member selected from natural rubber, polyisoprene rubber, polyisobutylene, polybutadiene rubber, styrene/butadiene/styrene block copolymer, styrene/isoprene/styrene block copolymer and the like.

The rubber base pressure-sensitive adhesive may be blended, as desired, with a tackifying agent, a plasticizer, a filler or the like and are preferably used in the form of a solvent type or an emulsion type containing the latex of the aforestated rubber.

As the aforesaid silicone base pressure-sensitive adhesive, use is preferably made of the compound containing as a principal component, polydimethylsiloxane, polydiphenylsiloxane and, as desired, a tackifying agent, a plasticizer, a filler or the like in the form of a solvent type.

Examples of the tackifying agent to be blended, as desired, with the pressure-sensitive adhesive include natural resin such as rosin base resin and polyterpene base resin and synthetic resin such as aliphatic petroleum resin ($C_5$ series), aromatic petroleum resin ($C_9$ series), alicyclic petroleum resin (DCPD series), cumarone resin, alkylphenol resin and xylene resin.

The pressure-sensitive adhesive layer comprising the above-mentioned pressure-sensitive adhesive may contain, as desired, an antioxidant (age resistor), a heat stabilizing agent, a light stabilizing agent or the like. The thickness of said pressure-sensitive adhesive layer may be suitably determined in the range of usually 5 to 50 $\mu$m, preferably 10 to 30 $\mu$m.

The pressure-sensitive adhesive layer need not be installed on the whole surfaces of the substrate sheet, but is installed, usually leaving the neighborhood of one edge being unequipped with said pressure-sensitive adhesive layer. This is intended to facilitate the peeling off of the pressure-sensitive adhesive sheets one by one from the laminate to be prepared from a plurality of said sheets.

The adhesive strength of the pressure-sensitive adhesive layer in the present invention is not specifically limited, but is preferably at least 500 gf/25 mm. A adhesive strength thereof, when less than 500 gf/25 mm, brings about a fear of causing relief peeling or peeling fall at the time of being adhesively bonded to an adherend, thus failing to exert the function as a display label. In view of the foregoing, the adhesive strength is more preferably at least 1000 gf/25 mm. The pressure-sensitive adhesive sheet according to the present invention may be peelable from an adherend or permanently stuck thereto, each depending upon the kind of the adherend, whereby the upper limit of the adhesive strength is unprescribed. The aforestated adhesive strength was determined using a cold rolled stainless steel plate as the adherend in accordance with JIS Z 0237-1980.

The pressure-sensitive adhesive sheets according to the present invention can be produced with good workability by using a simple apparatus, and besides are almost free from the generation of curls, unlike conventional pressure-sensitive adhesive sheets. The laminate of the present invention comprising a plurality of said pressure-sensitive adhesive sheets that are superimposed on one another is also free from curls at the end and edge thereof. By virtue of the foregoing, it is made possible to peel off the above-mentioned sheets one by one as a display label such as a home-delivery label, a commodity display label, a warning label and like label and adhesively bond the same to home-delivery cargoes, commodity packages, etc. with favorable workability. It is also made possible in the home-delivery label to stamp and/or write something on the portion free from the release layer and thereafter cut off said portion to use the same as a receipt for home-delivery.

In the following, the present invention will be described in great detail with reference to a comparative example and working examples, which however, shall not limit the present invention thereto.

EXAMPLE 1

A ultraviolet ray-sensitive cationically curing silicone-based release agent (produced by Toshiba Silicone Co., Ltd. under the trade name "TPR 6500") was applied to one side of a substrate sheet comprising wood free paper with a unit weight of 90 g/m$^2$ both the sides of which had been coated with a clay in a thickness of 15 μm, by the use of a mire bar, and then the release agent-coated surface was irradiated with ultraviolet ray at room temperature at an irradiation velocity of 10 m/minute by the use of a ultraviolet irradiator (120 W) of two high tension mercury vapor lamps to cure said release agent and form a release layer having a thickness of 2.0 μm. Subsequently, the surface of the substrate sheet opposite to the resultant release layer was coated with an acrylic solvent-based pressure-sensitive adhesive having a strong adhesive strength (produced by Toyo Ink Mfg. Co., Ltd. under the trade name "BPS 4429-4") by means of a roll knife coater without the use of a crosslinking agent, and the adhesive thus coated was dried to form a pressure-sensitive adhesive layer having a thickness of 20 μm so as to form a pressure-sensitive adhesive sheet. Then the resultant sheet was cut into flat sheets of an arbitrary size, and 100 sheets of them were laminated so that any of the pressure-sensitive adhesive layers directly faced any of the release layers. Thereafter the laminated product was cut so that the area coated with the pressure-sensitive adhesive occupied 80% of each of the pressure-sensitive adhesive sheets to form a laminate of said sheets.

Investigations were made on whether or not curls occurred after lamination and on the adhesion workability after 14 days from the date of laminate production. The adhesive strength of the sheets before lamination was determined using a cold rolled stainless steel plate (SUS 306) as the adherend in accordance with JIS Z 0237-1980. Moreover, the adherend was cheked for relief peeling and peeling off. The results are given in Table 2.

EXAMPLE 2

The procedure in Example 1 was repeated to prepare pressure-sensitive adhesive sheets and a laminate thereof except that there was used 100 parts by weight based on solid content of acrylic solvent base pressure-sensitive adhesive having strong adhesive strength (BPS 4429-4) as a pressure-sensitive adhesive blended with 0.5 part by weight of a metallic base crosslinking agent (produced by Toyo Ink Mfg. Co., Ltd. under the trade name "BXX 4805"). The results of evaluation are given in Table 2.

EXAMPLE 3

A blend of 100 parts by weight based on solid content of a ultraviolet lay-sensitive platinum addition type silicone base release agent (produced by Shin-Etsu Chemical Co., Ltd. under the trade name "X-62-5413") and 5 parts by weight of a platinum catalyst (produced by the same under the trade name "Cat-PL-5000") was applied to one side of a substrate sheet comprising wood free paper with a unit weight of 90 g/m$^2$ both the sides of which had been coated with a clay in a thickness of 15 μm, by the use of a mire bar, followed by heat treatment at 80° C. for 8 seconds and then the release agent-coated surface was irradiated with ultraviolet ray at room temperature at an irradiation velocity of 10 m/minute by the use of a ultraviolet irradiator (160 W) of two high tension mercury vapor lamps to cure said agent and form a release layer having a thickness of 2.0 μm. Subsequently, the surface of the substrate sheet opposite to the resultant release layer was coated with an acrylic solvent-based pressure-sensitive adhesive having strong adhesive strength (produced by Toyo Ink Mfg. Co., Ltd. under the trade name "BPS 4429-4") by means of a roll knife coater without the use of a crosslinking agent, and the adhesive thus coated was dried to form a pressure-sensitive adhesive layer having a thickness of 25 m so as to form a pressure-sensitive adhesive sheet. Then the resultant sheet was cut into flat sheets of an arbitrary size, and 100 sheets of them were laminated so that any of the pressure-sensitive adhesive layers directly faced any of the release layers. Thereafter the laminated product was cut so that the area coated with the adhesive occupied 80% of each of the pressure-sensitive adhesive sheets to form a laminate of said sheets.

Evaluations were made of the pressure-sensitive adhesive sheets thus obtained and the laminate formed therefrom in the same manner as in Example 1. The results are given in Table 2.

EXAMPLE 4

The procedure in Example 3 was repeated to prepare pressure-sensitive adhesive sheets and a laminate thereof except that there was used 100 parts by weight based on solid content of acrylic solvent base pressure-sensitive adhesive having strong adhesive strength (BPS 4429-4) as a pressure-sensitive adhesive blended with 0.5 part by weight of a metallic base crosslinking agent (produced by Toyo Ink Mfg. Co., Ltd. under the trade name "BXX 4805"). The results of evaluation are given in Table 2.

EXAMPLE 5

The procedure in Example 3 was repeated to prepare pressure-sensitive adhesive sheets and a laminate thereof except that there was used 100 parts by weight based on solid content of acrylic solvent-based pressure-sensitive adhesive having strong adhesive strength (BPS 4429-4) as a pressure-sensitive adhesive blended with 0.5 part by weight of an isocyanate base crosslinking agent (produced by Toyo Ink Mfg. Co., Ltd. under the trade name "BHS 8515"). The results of evaluation are given in Table 2.

COMPARATIVE EXAMPLE 1

A blend of 100 parts by weight based on the solid content of a heat curing type silicone resin (produced by Toray Dow Corning Silicone Co., Ltd. under the trade name "SRX 357") and 0.6 part by weight of a catalyst (produced by the same under the trade name "SRX 212") was applied to one side of the same substrate sheet that was used in Example 1 by the use of a mire bar, and then the coated silicone resin was subjected to hot air-drying treatment at 130° C. for one minute to cure the same and form a release layer having a thickness of 2.0 μm. Thereafter, pressure-sensitive adhesive sheets and a laminate thereof were prepared in the same manner as in Example 1. The results of evaluation are given in Table 2.

TABLE 2

|  | Example 1 | Example 2 | Example 3 | Example 4 | Example 5 | Comparative Example 1 |
|---|---|---|---|---|---|---|
| Pressure-sensitive adhesive | acrylic base non-crosslinked | acrylic base crosslinked with metallic crosslinker | acrylic base non-crosslinked | acrylic base crosslinked with metallic crosslinker | acrylic base crosslinked with isocyanate | acrylic base non-crosslinked |
| Release agent (silicone resin) | cationically curing type | cationically curing type | platinum addition type | platinum addition type | platinum addition type | Heat curing type |
| Curl after lamination | no curl | no curl | no curl | no curl | no curl | curl |
| Adhesion workability[1] | good | good | good | good | good | poor (curl) |
| Adhesive strength[2] (g/25 mm) | 1400 | 1500 | 1300 | 1450 | 1600 | 1450 |
| Lifting of pressure-sensitive adhesive sheet | none | none | none | none | none | none |

Remarks
[1]After 14 days from, laminate production.
[2]Adhesive strength was determined using a cold rolled stainless steel plate as the adherend in accordance with JIS Z 0237-1980.

As can be seen from Table 2, Examples 1 to 5 demonstrate non-curling after lamination and sufficient adhesive strength, whereas Comparative Example 1 reveals higher curing temperature (130° C.), the generation of curls after lamination and poor adhesion workability because of the heat curing type silicone resin used as the release agent.

What is claimed is:

1. A pressure-sensitive adhesive sheet which comprises a substrate sheet, a pressure-sensitive adhesive layer formed on at least part of one side of said substrate sheet and a release layer formed on at least part of the other side of said substrate sheet, said release layer being a cured product of an ionizing radiation-curable releasable resin selected from the group consisting of an ultraviolet-sensitive, cationically curable silicone resin containing a cationic photopolymerization catalyst and an ultraviolet sensitive, photoactive platinum-based catalyst-containing silicone resin.

2. The pressure-sensitive adhesive sheet according to claim 1, wherein said releasable resin is an ultraviolet-sensitive, cationically curable silicone resin which has a vinyl ether group or an epoxy group.

3. The pressure-sensitive adhesive sheet according to claim 1, wherein said releasable resin is said platinum-based catalyst-containing silicone resin which is methylvinylpolysiloxane or methylhydrogenpolysiloxane, each having a polyfunctional vinyl group.

4. The pressure-sensitive adhesive sheet according to claim 1, wherein said releasable resin is said platinum-based catalyst-containing silicone resin and said platinum-based catalyst is a photoactive catalyst selected from the group consisting of platinum bis(2,4-pentadionate), diphenylplatinum (1,5-cyclooctadiene) and diphenylplatinum (2,4-hexadiene).

5. The pressure sensitive adhesive sheet according to claim 4, wherein said platinum based catalyst-containing silicone resin is methylvinyl polysiloxane or methylhydrogenpolysiloxane each having a polyfunctional vinyl group.

6. A laminate comprising a plurality of said pressure-sensitive adhesive sheets according to claim 1, said pressure-sensitive adhesive sheets being superimposed on one another so that the pressure-sensitive adhesive layer and the release layer directly face each other and the whole surfaces of the pressure-sensitive adhesive layers are covered with the release layers.

7. The laminate according to claim 6, wherein said releasable resin is an ultraviolet-sensitive, cationically curable silicone resin which has a vinyl ether group or an epoxy group.

8. The laminate according to claim 6, wherein said releasable resin is said platinum-based catalyst-containing silicone resin which is methylvinylpolysiloxane or methylhydrogenpolysiloxane, each having a polyfunctional vinyl group.

9. The laminate according to claim 6, wherein said releasable resin is said platinum-based catalyst-containing silicone resin and the platinum-based catalyst is a photoactive catalyst selected from the group consisting of platinum bis(2,4-pentadionate), diphenylplatinum (1,5-cyclooctadiene) and diphenylplatinum (2,4-hexadiene).

10. The laminate according to claim 9, wherein said platinum-based catalyst-containing silicone resin is methylvinyl polysiloxane or methylhydrogen polysiloxane, each having a polyfunctional vinyl group.

11. The pressure-sensitive adhesive sheet according to claim 1, wherein the ionizing radiation-curable resin is an ultraviolet-sensitive, cationically curable silicone resin and wherein said cationic photopolymerization catalyst is a triarylsulfonium salt, a triaryliodinium salt or bis(dodecylphenyl)hexafluoroantimonate.

12. The pressure-sensitive adhesive sheet according to claim 6, wherein the ionizing radiation-curable resin is an ultraviolet-sensitive, cationically curable silicone resin and wherein said cationic photopolymerization catalyst is a triarylsulfonium salt, a triaryliodinium salt or bis(dodecylphenyl)hexafluoroantimonate.

13. The pressure-sensitive adhesive sheet according to claim 1, wherein the ionizing radiation-curable releasable resin has been cured at 0 to 80° C.

* * * * *